United States Patent
McGeehan et al.

(10) Patent No.: US 6,229,992 B1
(45) Date of Patent: May 8, 2001

(54) FULL-DUPLEX RADIO TRANSMITTER/RECEIVER

(75) Inventors: Joseph Peter McGeehan, Wiltshire; Andrew Bateman, Bath; Mark Anthony Beach, Bristol; Peter Blakeborough Kenington, Bristol; Wycliffe Timothy Slingsby, Bristol, all of (GB)

(73) Assignee: University of Bristol, Bristol (GB)

( * ) Notice: Subject to any disclaimer, the term of this patent is extended or adjusted under 35 U.S.C. 154(b) by 0 days.

(21) Appl. No.: 08/836,552

(22) PCT Filed: Nov. 15, 1995

(86) PCT No.: PCT/GB95/02684

§ 371 Date: Sep. 29, 1997

§ 102(e) Date: Sep. 29, 1997

(87) PCT Pub. No.: WO96/15596

PCT Pub. Date: May 23, 1996

(30) Foreign Application Priority Data

Nov. 15, 1994 (GB) .................................................. 9423027

(51) Int. Cl.[7] .............................. H04B 1/44; H04B 7/14; H04B 1/10; H04B 1/06
(52) U.S. Cl. ................................ 455/78; 455/79; 455/24; 455/63; 455/278.1; 455/296; 370/278
(58) Field of Search ................................ 455/78, 24, 63, 455/278.1, 296, 324, 79; 377/278

(56) References Cited

U.S. PATENT DOCUMENTS

| 4,383,331 | 5/1983 | Davidson | 455/24 |
|---|---|---|---|
| 4,594,479 | 6/1986 | Farrow et al. | 179/170.2 |
| 4,952,193 | 8/1990 | Talwar | 455/63 |
| 4,991,165 | 2/1991 | Cronyn | 370/32 |

FOREIGN PATENT DOCUMENTS

| 0 215 479 | 3/1987 | (EP) . |
|---|---|---|
| 0 227 393 | 7/1987 | (EP) . |
| 2 226 204 | 6/1990 | (GB) . |
| 2 270 444 | 3/1994 | (GB) . |
| WO 84/02626 | 7/1984 | (WO) . |

*Primary Examiner*—Dwayne Bost
*Assistant Examiner*—Raymond B. Persino
(74) *Attorney, Agent, or Firm*—Townsend and Townsend and Crew LLP

(57) ABSTRACT

A full-duplex radio transceiver, in which cancellation of transmission signals in the receive path is achieved by sampling the transmission signals, and controllably adjusting the gain and phase of the sampled signal, before subtracting the adjusted signal from the received signals in order to minimise the component of the transmission signals appearing in the received signals. Processing is done in a DSP at or near baseband.

13 Claims, 4 Drawing Sheets

FULL-DUPLEX RADIO TRANSMITTER/RECEIVER

The invention relates to full-duplex radio transmitter/receivers. With such radio transceivers the antenna arrangement may comprise a common transmit/receive antenna, or electrically separated antennas which are physically joined together or physically and electrically separate antennas which can be an the same housing or otherwise positioned very close to one another. Such a transmitter/receiver, or transceiver unit, conventionally employs a diplexer filter to prevent the receiver components being overloaded by signals coupled from the transmitter channel. The two channel frequencies are separate and the filter discriminates the signals on the basis of frequency.

For optimum radio spectrum utilisation the transmit/receive frequencies should be close, but constraints on the design of the diplexer filter mean that the smaller the transmit/receive frequency split, the bulkier and costlier is the diplexer filter. Largely for this reason the current cellular radio telephone system operating at 900 MHz has a transmit/receive channel split of 45 MHz, namely about 5% of the operating frequency. Many systems, including the recently proposed 220 MHz system in the USA, operate with a much narrower transmit/receive split, eg 1 MHz at 220 MHz. This represents only about 0.45% and the bulk and expense of an adequate diplexer filter would prohibit the satisfactory implementation of hand-held full-diplex transceivers.

An object of the invention is to provide a transceiver with an alternative to a diplexer filter.

According to the invention there it provided a radio transceiver, comprising:
at least one antenna, for receiving signals and for transmitting signals;
means for generating signals to be transmitted;
means for processing received signals;
means for generating a cancellation signal from the signals to be transmitted;
means for subtracting the cancellation signal from the received signals to produce cancelled received signals for processing; and,
means for controlling the generation of the cancellation signal in order to minimise the amount of the signals for transmission appearing in the cancelled received signals.

This has the advantage that the transmitter output signal can be largely removed from the receiver input, irrespective of the presence or otherwise of a transmit/receive frequency split.

The invention will further be described with reference to the accompanying drawings, of which:

Figure 1:
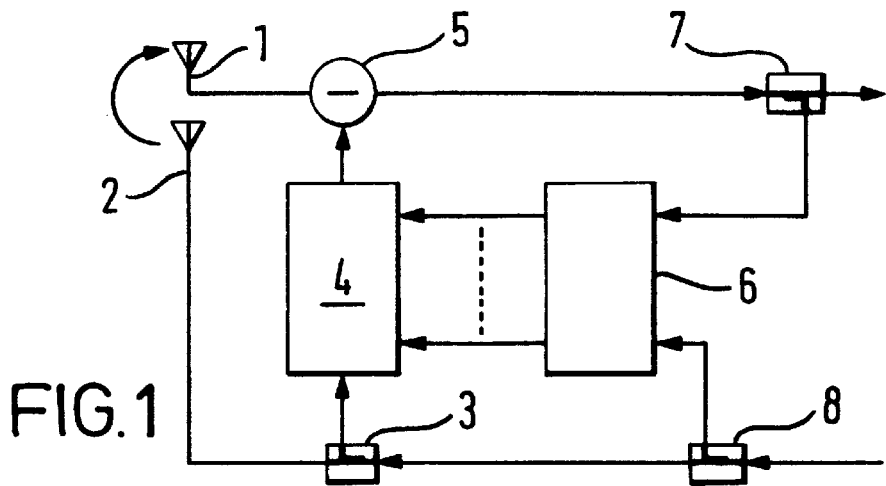
FIG. 1 is a schematic circuit diagram of part of a transceiver embodying the invention.

Referring to FIG. 1 there is shown part of a radio transceiver having a receive antenna 1 and a transmit antenna 2. In practice, antenna 1 may be the same as, or part of antenna 2. In either case, the signal from antenna 1 will contain a significant degree of unwanted coupling of the transmitter output signal. This coupling (or its effects) must be removed in order to prevent overloading of the front-end components within the receiver section. This it done by taking a sample of the transmitter output signal by a coupler 3 and, after suitable processing in a processing unit 4, subtracting this signal from the receiver input signal using a subtracter 5. Since the receiver input signal will contain both the wanted signal and the unwanted coupling, this subtraction process will remove the unwanted coupling to a high degree.

Control elements 6 are provided which use samples of the receive signal after cancellation via a coupler 7 and/or the transmit signal via a coupler 8 in order to provide intelligent and rapid control of the signal processing elements so as to obtain and maintain optimum cancellation. The control process can take place in real time or may utilise a periodic updating mechanism.

Figure 2:
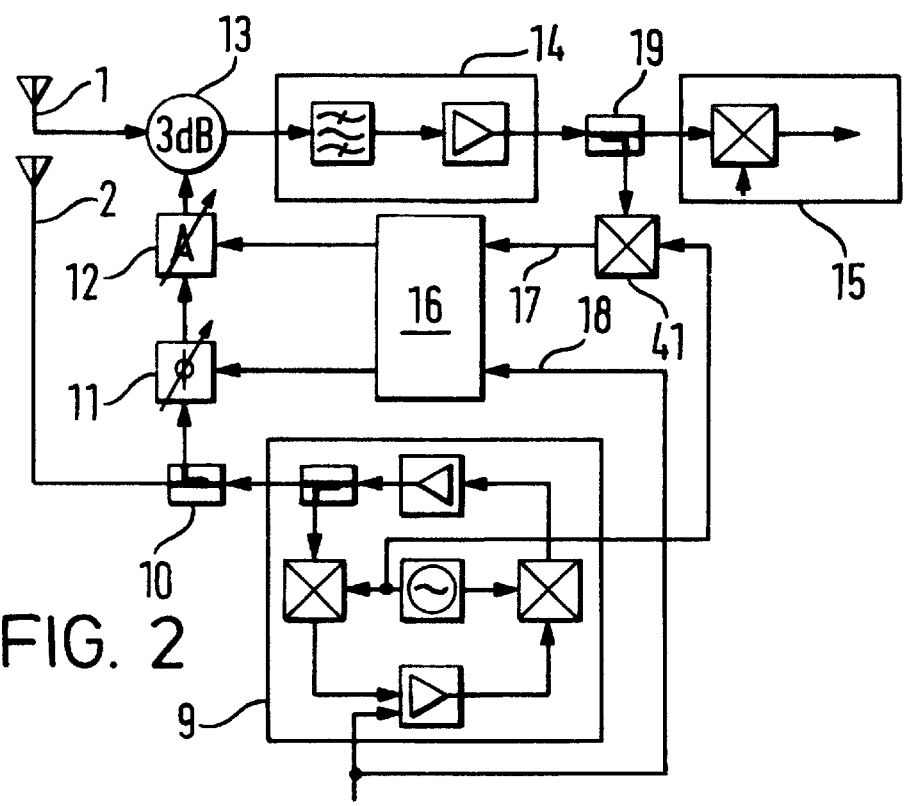
FIG. 2 is a schematic circuit diagram of part of a transceiver for linear radio, employing a Cartesian loop and embodying the invention.

Referring now to FIG. 2 an embodiment of the invention is illustrated as applied to a transceiver for a linear radio having a Cartesian loop transmitter 9. As used herein "linear radio" means a radio in which the baseband signal information is transmitted by one or other or both of amplitude and phase modulation of a carrier. Such radios may be used for the transmission of SSB, AM, FM, 16-QAM and almost any other recognised form of modulation.

A sample of the transmit signal from the Cartesian loop transmitter 9 is taken via a coupler 10, and processed by a phase-shift element 11 and a variable attenuator 12 before being fed to one input of a subtracter 13. The received signal from antenna 1 forms the other input to the subtracter and the result of the traction process is fed to the receiver front-end 14. If the variable phase and attenuator elements 11 and 12 are correctly adjusted, the signal appearing at the input to the receiver, front-end 14 will contain, predominantly, the wanted receive signal. Thus, the unwanted transmitter output signal will have been substantially eliminated. The receiver front-end will therefore not suffer from overloading and is able to function normally. The remainder of the receiver processing 15 (mixing amplification and detection) can then operate as in any other standard receiver configuration.

It is important to control the variable phase 11 and attenuation (or gain) 12 elements in order to achieve and maintain optimum cancellation of the unwanted transmitter output signal from the receive signal path. For this purpose a control circuit 16 is configured to provide the required parameter optimisation for both of the signal processing elements 11 and 12, based on the measurement of one or more error signals at 17 relative to one or more reference signals at 18 derived from the transmitter (in this case a Cartesian loop, although any form of transmitter employing I/Q baseband input signal information could be used in a similar manner) other embodiments of the invention may derive the error signal(s) and/or the reference signal(s) from different elements of the system, or indeed from different signals altogether.

In the present embodiment of the invention, the reference signals at 18 are formed from the baseband (or audio) inputs to the transmitter (in this case supplied in quadrature components I/Q), or a signal derived therefrom, and these form one set of inputs to the control circuit 16. The other set of inputs at 17 formed from a coherent quadrature downconversion of a sample of the received signal derived via a coupler 15 after processing by the front-end components 14. Thus, the mixer Circuit illustrated by the reference numeral 41 includes a 90° splatter acting on the input local oscillator signal, plus respective mixers for performing the downconversion in I and Q. The oscillator used for this downconversion process is the same in this embodiment as that used for upconversion in the Cartesian loop 9. Thus two sets of inputs are supplied to the control circuit 16, which is sufficient to provide optimum control of the signal processing elements 11 and 12 in order to maximise the cancellation of the transmitter output signals in the receive signal path.

Figure 3:
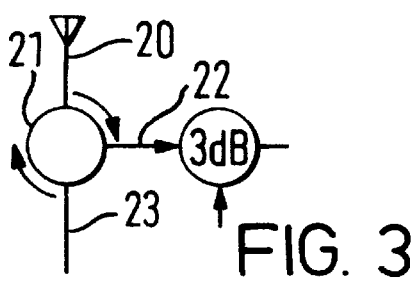
FIGS. 3 and 4 are diagrams illustrating respective different antennae systems for the transceiver of FIG. 2.

FIG. 3 shows an alternative antenna arrangement for the transceiver of FIG. 2. The separate transmit and receive antennas are replaced by a single antenna 20 and a circulator 21, there being an output 22 to the receive channel and an input 23 from the transmit channel. The action of the circulator is to permit a radio frequency signal within its operating frequency range to travel in only one direction (illustrated by the arrows in FIG. 3). The transmitter output signal therefore appears at the receiver input at a significantly reduced level.

Figure 4:
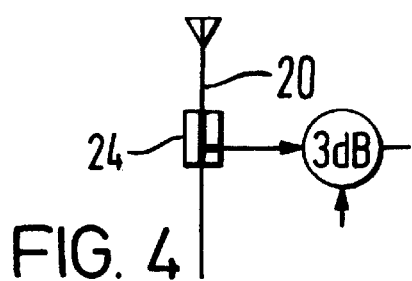

FIG. 4 shows another antenna arrangement for the transceiver of FIG. 2, achieving a similar result to that of FIG. 3. In FIG. 4 there is a directional coupler 24 in the transmit signal path. The coupler is arranged such that the transmit signal passes to the common antenna 20 (relatively) unimpeded and the unidirectional coupled port feeds the receiver input. The directivity of the coupler ensures that a significantly reduced level of the transmitter output signal appears at the input to the receiver.

These configurations have the advantage over the arrangement of FIG. 2 that a single antenna is generally much more acceptable to users of both handportable and mobile equipment. However, the operation of both of these elements (circulator and coupler) is far from perfect and the degree of rejection which they provide of the transmitter output signal at the receiver input is nowhere near enough for satisfactory operation of the receiver, without the additional cancellation circuitry which is described herein.

Figure 5:
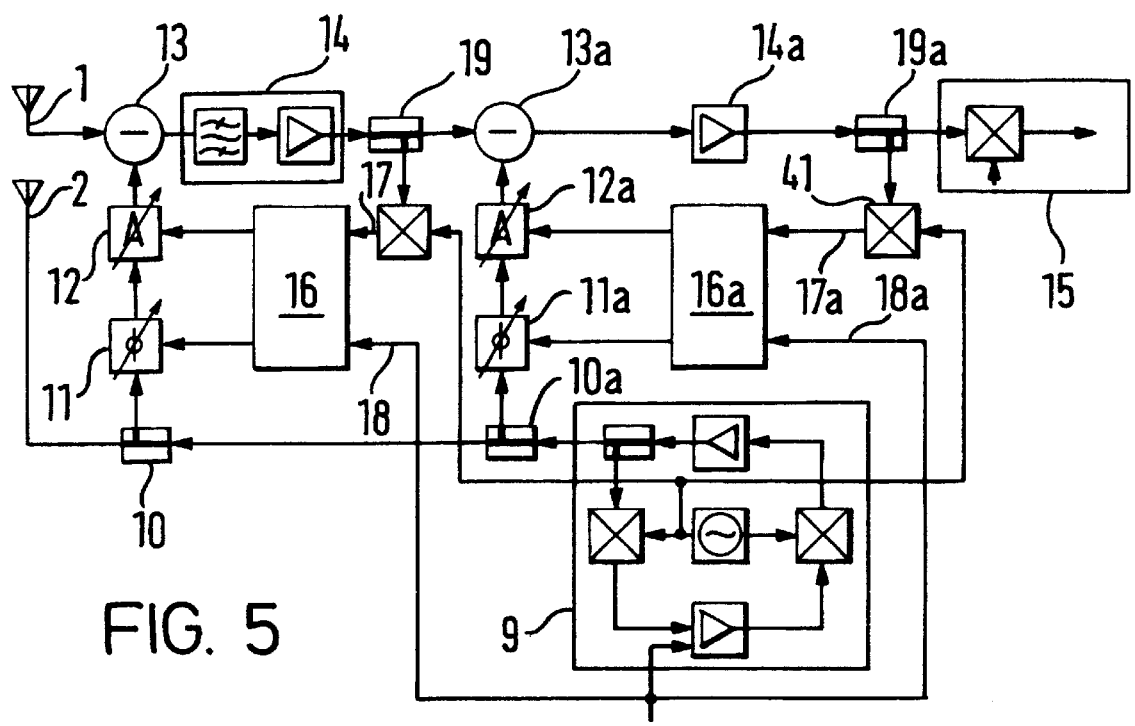
FIG. 5 is a schematic circuit diagram showing enhancements to the FIG. 2 embodiment.

An enhancement of the present invention is illustrated in FIG. 5, in which components having the same functions as components of the FIG. 2 embodiment are indicated by the same reference numerals. In the event that a sufficient degree of cancellation is not provided by a single subtraction process, a number of additional subtraction processes may be included (only one additional process is shown in FIG. 5). These processes may be controlled in the manner described above for a single subtraction, or alternatively, delay elements may be inserted in some or all of the signal paths to permit cancellation of elements of the unwanted transmitter output signal which have arrived at the receive antenna by a longer path than that of direct transmission. An example of such a path would be a reflection caused by a nearby object, for example a filing cabinet or wall. In FIG. .5 the additional stage comprises coupler 10a; phase adjuster 11a; amplitude adjuster 12a; subtracter 13a; amplifier 14a; and coupler 19a arranged in a manner directly equivalent to the elements 10, 11, 12, 13, 14 and 19 respectively. Parallel reference outputs are taken from the Cartesian loop transmitter to give rise to error signals at 17a and reference signals at 18a equivalent to the signals at 17 and 18 respectively.

A practical realisation of the cancellation function described above is preferably achieved by using a digital signal processor (DSP) as the control circuit 16, 16a etc. DSPs are programmable integrated circuit devices and the programming techniques required are well known. For example, a description is given in the book "Digital Signal Processing Design" by Andrew Bateman and Warren Yates published by Pitman, London in 1998.

DSPs operate at audio frequencies and can be used as control circuits in the system described above using a Cartesian loop transmitter where the actual audio modulation is being detected in I and Q (in phase and quadrature) directly. However, it is possible to employ the general cancellation techniques described herein in a wide range of transceivers. In such systems it may not be possible to detect the modulation by I and Q downconversion (as is the case when using a cartesian loop transmitter) and hence, a more general solution is required.

The form of this solution is to generate an audio frequency IF to supply the necessary reference and error information to the DSP. This then removes the DC offset problems in mixers and amplifiers which would seriously degrade the performance of a zero-IF (or DC-IF) system. The DC detection process can then be performed within the DSP, with no DC offset problems.

Figure 6:
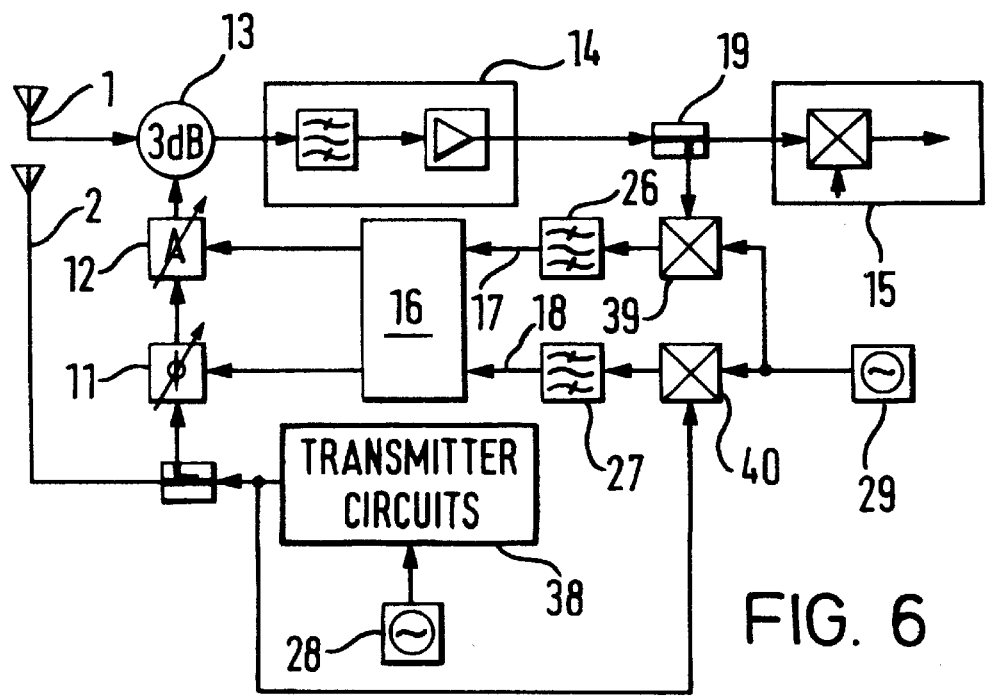
FIG. 6 is a schematic circuit diagram illustrating the use of a digital signal processor (DSP), as, the control circuit of the arrangement of FIG. 2.

The basic form of such a system is shown in FIG. 6, in which components having the same functions as components of the FIG. 2 embodiment are indicated by the same reference numerals. The transmitter circuits 38 have a local oscillator 28, and mixers 39, 40 are provided in the input lines 17, 18 to the control circuits. The mixer 39 receives transmitter signals and a signal from an additional oscillator 29 at a frequency offset from the local oscillator frequency by an audio frequency IF. For example, the audio IF may be at 5 kHz (although it could appear at any frequency capable of being processed by a DSP) The mixer 40 receives a signal sampled from the receive signals by a coupler 99 and a signal from the addition oscillator 29. The mixers then act such that the error and reference signals appear at 5 kHz, and 5 kHz band-pass filters 26, 27 are included in the input lines 17 and 18. If the transmitter has only a single local oscillator 28 for upconversion the arrangement is straightforward. In the case of transmitters with more than one local oscillator, the additional oscillator 29 frequency must be taken as the transmitter output frequency plus or minus a multiple of the audio IF frequency.

Typically, the control circuitry will include either one or two mixers to yield either one or two error signals (respectively) for processing by the DSP. These mixers would be conventional RF mixers suitable, for the operating frequency (e.g. diode-ring passive mixers or semiconductor active mixers). The control circuitry would then further include either two or three analogue-to-digital input channels (which may be obtained from a single A/D converter and a two or three-channel multiplexer) These channels are required for the error signal(s) and the reference signal. These signals are then supplied to a digital signal processor (e.g. Texas Instruments TMS32010 or TMS320C25), which has at its output two channels of digital-to-analogue conversion to control the phase-shifter and variable attenuator.

Figure 7:
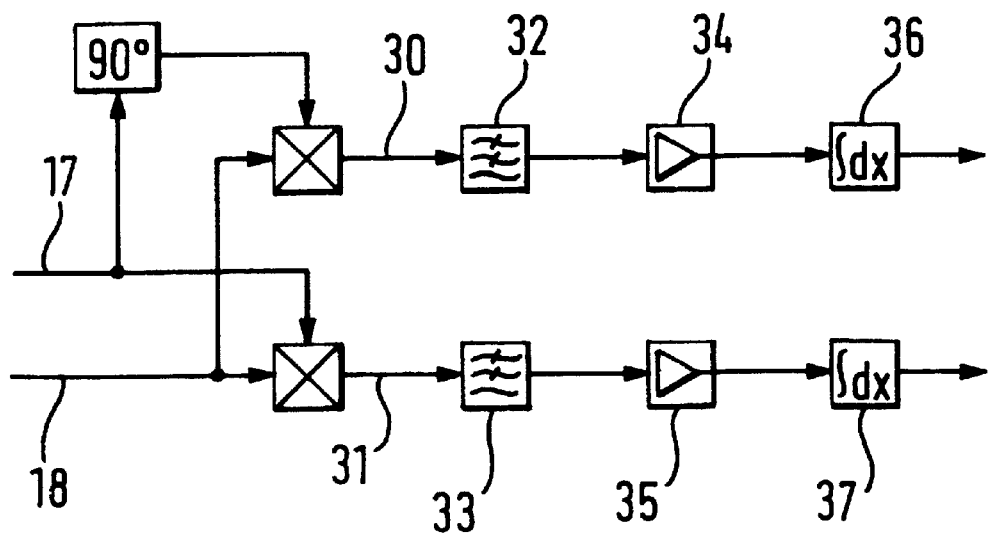
FIG. 7 is a schematic diagram illustrating the program requirements for the DSP of FIG. 6.

The reason why only a single error signal may be required is that the I/Q mixing process can form part of the detection process and can therefore take place within the DSP (hence forming an I/Q detection process). This increases the software complexity a little, but reduces the overall component count and hence is advantageous for mass-production systems. A block diagram of the software required in the DSP for a single error signal system it shown in FIG. 7. This diagram would be basically identical for both the cartesian loop system shown in FIG. 2 and for the audio IF system shown in FIG. 6. In the former system, the actual audio modulation is being detected in I and Q directly and in the latter case an audio tone it the audio IF frequency (e.g. 5 kHz) is being detected, again in I and Q.

The operation of the signal processing performed by the software is extremely straightforward. The signal is detected into two mutually orthogonal components at 30 and 31 which ultimately provide two independent control signals. The components, which having been detected are basically DC, are filtered at 32 and 32 to remove unwanted mixer products and then amplified at 34 and 35. The resulting DC signals are fed to integrators at 36 and 37 which control the variable gain and phase elements, in accordance with the required quadrant. The action of the system is therefore to mimimise the DC control signals, yielding stable operating points for the integrators (i.e. DC inputs of 0 V) and therefore to minimise the input error signal with respect to the input reference signal.

The input error signal may be an audio tone, or the detected (audio) modulation from the transmitted signal; in either case it will be minimised and hence the transmitter output signal will be minimised in the received path.

Figure 8:
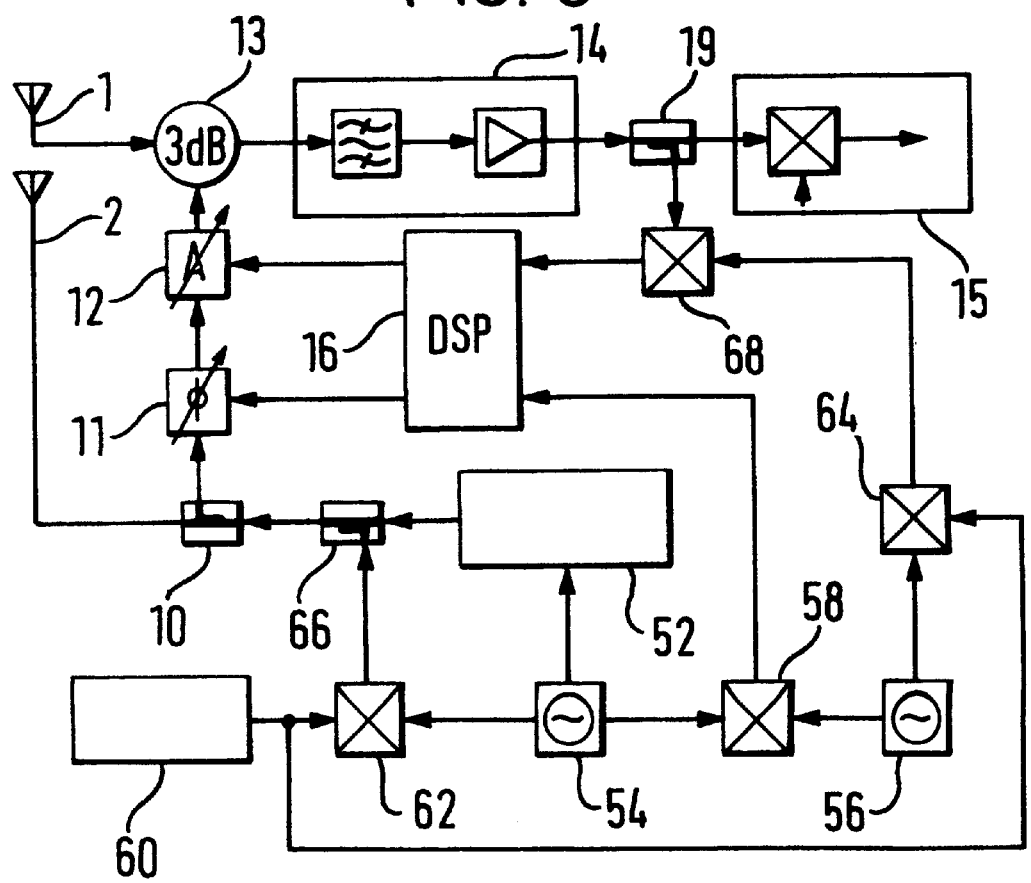
FIG. 8 is a schematic circuit diagram of a further transceiver in accordance with the invention.

FIG. 8 shows a further embodiment of a transceiver in accordance with the invention. As before, components having the same functions as components of the circuit shown in FIG. 2 have been given the same reference numerals as appear in FIG. 2, and the description thereof will not be repeated.

The circuit shown in FIG. 8 works by injecting a sounding signal into the transmitter output signal, and by detecting that sounding signal in the received signal path, and then applying the cancellation signal, such that the sounding signal component in the received signal is minimised.

Thus, the transceiver shown in FIG. 8 has transmitter circuits 52, and a local oscillator 54. The circuit also includes an offset oscillator 56, generating a signal which is offset from the local oscillator frequency by a known intermediate frequency. Signals from the local oscillator 54 and offset oscillator 56 are supplied to a mixer 58, which therefore outputs an intermediate frequency signal for processing in the DSP 16. The sounding signal which is to be insetted in the transmitter output signal may be of any form, although it is preferably in the form of a spread-spectrum signal, for example a carrier binary phase-shift key modulated by a maximal-length sequence. Thus, as shown in FIG. 8, the transceiver circuit further comprises an M-sequence generator 60, which supplies its output signal to two further mixers 62, 64. The first of these further mixers 62 receives its other input signal from the local oscillator 54, and the resulting output signal is used as the sounding signal. This output is supplied to a coupler 66, where the sounding signal is added into the signal to be transmitted. The second further mixer 64 receives its second input signal from the offset oscillator 56, and generates an output signal which is offset by the intermediate frequency from the sounding signal. This detection signal is supplied to a further mixer 68, which receives the sampled receiver output signal from the coupler 19. Thus, any component of the sounding signal appearing in the receiver output signal produces an error signal at the known intermediate frequency when mixed with the detection signal supplied by the mixer 64. The output from the mixer 68 is supplied to the DSP 16.

Thus, as before, the error signal can be used to generate control signals for the variable phase element 11 and variable gain element 12, in order to generate a cancellation signal which can be applied to the signal from the receive antenna 1, in order to minimise the size of the transmitter output signal component in the receive signal.

Of course, the sounding signal must be arranged not to interfere with the wanted signal, and must also not cause undue interference with adjacent channels. It is for this reason that a spread-spectrum signal is the most appropriate.

The invention is riot restricted to the details of the embodiments described above. The detailed realisation of the control circuit may be achieved in many ways and depends upon the precise form of the reference and/or error signal inputs. In the embodiment of the invention as illustrated in FIG. 2, the function of the control circuit is primarily to adjust the signal processing elements in order to minimise the level of the error signals at its input and to maintain that state as conditions change (such as the movement of persons or objects in the vicinity of the aerial(s)). The purpose of the reference signals in this case is to provide a coherent reference with which to perform this minimisation. Clearly, the reference signals could be omitted and an energy minimization performed on one or more of the error signals.

Alternatively, the I/Q control signals could be mathematically converted to amplitude (A) and phase (Φ) signals within the DSP (or externally) according to the following relationships:

$$A = \sqrt{I^2 + Q^2}$$
$$\Phi = \tan^{-1}\left(\frac{Q}{I}\right)$$

As an alternative amplitude and phase detection may be performed directly by means of, for example, an offset-frequency downconversion to audio (similar to that shown in FIG. 6) and processing within the DSP to square the signal (eg multiply it with itself) for amplitude detection and to implement a phase-locked loop (PLL) for phase detection. Many other possible mechanisms exist to perform amplitude and phase detection including, for example, energy detection and phase-detection at radio frequency, and any of these methods may be employed without departing from the scope of the present invention.

Figure 9:
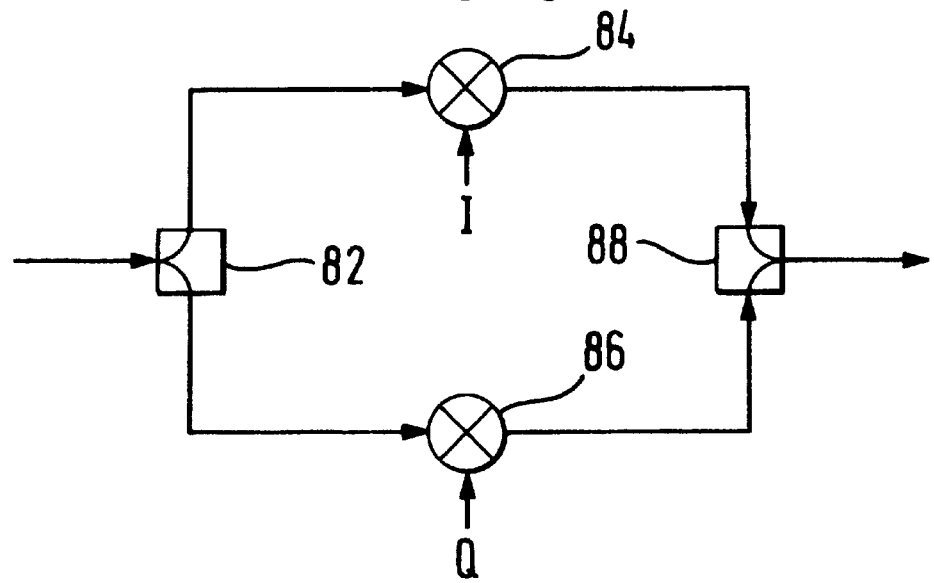
FIG. 9 illustrates an alternative form of a part of the control circuitry which may be used in the invention.

In the embodiments of the invention illustrated and described above, the cancellation signal to be applied to the receive signal is generated by sampling the signal to be transmitted and applying gain and phase control to it FIG. 9 illustrates an alternative arrangement using a vector modulator. When used in a transceiver having a configuration as shown in FIGS. 2, 5, 6 or 8, the sampled transmitter output from the coupler 10 is input to a 3 dB 90 splitter 82, and then to respective mixers 84, 86. The mixers 84, 86 receive I and Q control signals from the DSP 16, and the output signals from the mixers 84, 86 are supplied to an in-phase combiner 88, and then output to the subtracter 13. Thus, the I and Q inputs control the I and Q signal vectors directly, rather than controlling amplitude and phase.

Figure 10:
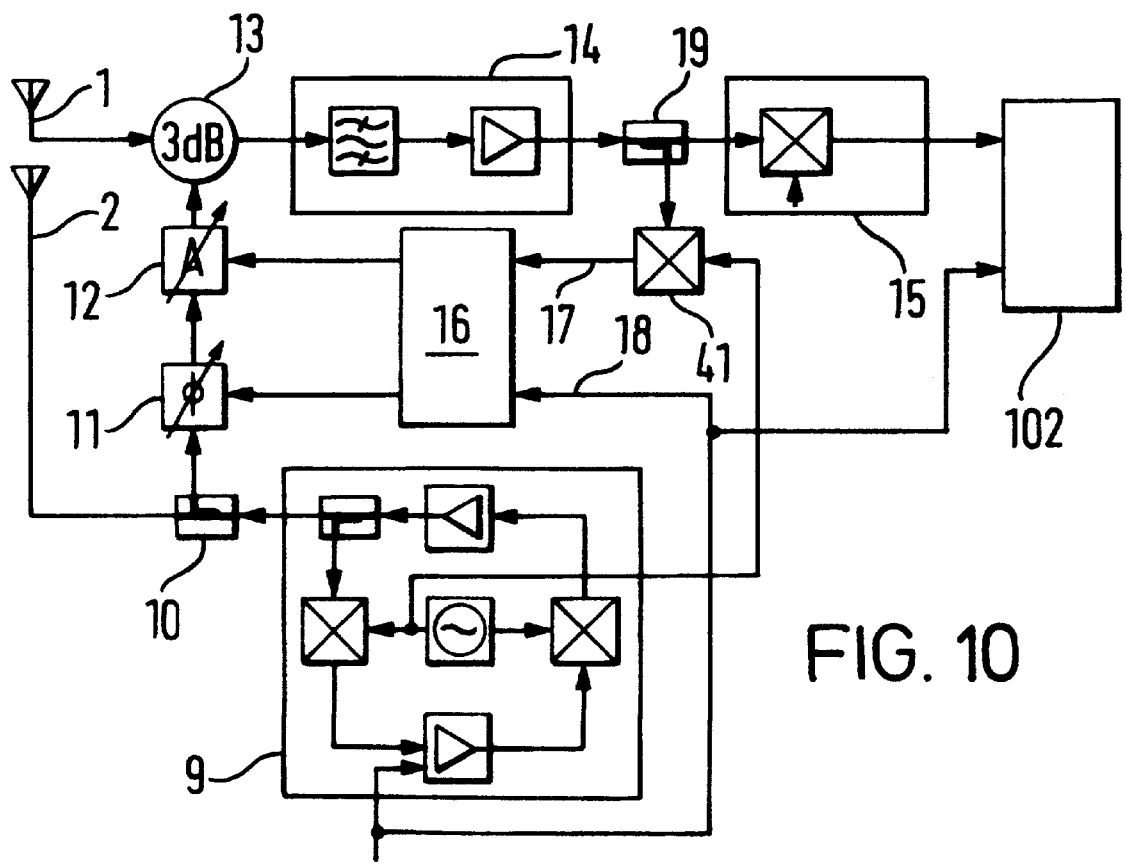
FIG. 10 shows a further alternative transceiver in accordance with the invention.

FIG. 10 shows a further embodiment of the invention utilising an additional cancellation technique. The circuit of FIG. 10 is the same as of FIG. 2 (although it can of course be any transceiver circuit in accordance with the invention), but also shown is the receiver DSP 102. The receiver DSP 102 receives the signal from the input receiver processing circuit 15 and also receives the audio frequency Input which is used as a reference input by the DSP 16. Thus, by using this signal as its own reference input, the DSP 102 can detect, and apply adaptive noise cancellation to, any remaining uncancelled components of the transmitter signal in the receiver signal.

The embodiments of the invention specifically described above use a cartesian loop form of transmitter. It is a simple matter to substitute any other form of transmitter and utilise a coherent downconversion process to supply the error signal(s) based on the local oscillators utilised in the upconversion processes within that transmitter.

In each of FIGS. 2 and 5, many of the components may be interchanged or even omitted altogether, without affecting the fundamental method of operation. For example, the "front end" components may appear anywhere in the top path, such as after the sampling coupler in FIG. 2 or between, the subtraction processes in FIG. 5. The amplification process after the second subtraction process in FIG. 5 may also be omitted. The variable attenuation and phase components may be interchanged, again without detracting from the present invention.

Finally, differing transmitter and receiver architectures may he utilised, in place of those shown above. For example, a dual or multiple channel diversity receiver nay be employed, in which case a number of subtraction processes would be required, with at least one being required for each diversity channel. Although the invention has been described above mainly in connection with narrowband systems, the invention is also applicable to wideband signals such as those used in CDMA (code-division multiple-access) and TDMA (time-division-multiple-access). Other forms of linear or constant-envelope transmitter may also be employed; examples could include, but are not restricted to: Envelope Elimination and Restoration, LINC (Linear Amplification Using Non-Linear Components), Feedforward Linearisation, Feedback Linearisation and Predistortion (both adaptive and non-adaptive).

What is claimed is:

1. A radio transceiver, comprising:
    at least one antenna arrangement, for receiving signals and for transmitting signals;
    means for receiving a baseband input signal;
    a local oscillator operating at a local oscillator frequency;
    a mixer for upconverting the input signal to a transmission frequency;
    means for sampling the signals to be transmitted;
    means for generating cancellation signals from the sampled signals to be transmitted;
    means for subtracting the cancellation signals from the received signals to produce cancelled received signals for processing;
    means for sampling the cancelled received signals;
    a mixer that receives the local oscillator signal as one input and receives the sampled cancelled received signals at another input so as to downconvert the sampled cancelled received signals to baseband or near baseband;
    digital signal processing means, responsive to the downconverted sampled cancelled received signals and the baseband input signal, for controlling the generation of the cancellation signals by controlling the signal vector thereof in order to minimise the amount of the signals to be transmitted appearing in the downconverted sampled cancelled received signals; and
    means for processing the cancelled received signals.

2. A radio transceiver as claimed in claim 1, wherein the means for controlling the generation of the cancellation signal comprises a variable phase shifter and a variable attenuator, to which are supplied signals derived from the signals to be transmitted.

3. A radio transceiver as claimed in claim 2, wherein the means for controlling the generation of the cancellation signal comprises means for detecting the power of in-phase and quadrature components of the error signal, and means for adjusting the variable phase shifter and the variable attenuator in order to minimise the power of said components.

4. A radio transmitter as claimed in claim 2, wherein the means for controlling the generation of the cancellation signal comprises means for detecting the amplitude and phase of a component of the signalsto be transmitted appearing in the received signals, and means for adjusting the variable phase shifter and variable attenuator to minimise the power of said component.

5. A radio transceiver as claimed in claim 1, wherein the means for controlling the generation of the cancellation signal comprises means for minimising the power of an error signal obtained by sampling the received signals at the frequency of the signals to be transmitted.

6. A radio transceiver as claimed in claim 1, wherein the means for controlling the generation of the cancellation signal comprises a vector modulator to which is supplied a signal derived from the signals to be transmitted.

7. A radio transceiver as claimed in claim 1, wherein the means for generating signals for transmission comprises a local oscillator operating at a local oscillator frequency, and wherein the transceiver farther comprises:
    an additional oscillator, operating at a frequency equal to the local oscillator frequency offset by an audio frequency intermediate frequency; and
    a pair of mixers, for mixing cancelled received signals and signals for transmission respectively with signals from the additional oscillator, in order to obtain error and reference signals respectively at the intermediate frequency.

8. A radio transceiver as claimed in claim 1, comprising:
    first means for generating a first cancellation signal from the signals to be transmitted;
    second means for generating a second cancellation signal from the signals to be transmitted;
    means for subtracting the first cancellation signal from the received signals to produce first cancelled received signals;
    means for controlling the generation of the first cancellation signal in order to minimise the amount of the signals for transmission appearing in the first cancelled received signals;
    means for subtracting the second cancellation signal from the first cancelled received signals to produce second cancelled received signals for processing; and
    means for controlling the generation of the second cancellation signal in order to minimise the amount of the signals for transmission appearing in the second cancelled received signals.

9. A radio transceiver as claimed in claim 1, in which the antenna arrangement comprises a receive antenna and a transmit antenna which are electrically separated.

10. A radio transceiver as claimed in claim 1, in which the antenna arrangement comprises a single receive/transmit antenna, and a circulator, connected to the antenna such that signals to be transmitted pass along one line to the antenna, and received signals from the antenna are passed along another line.

11. A radio transceiver as claimed in claim 1, in which the antenna arrangement comprises a single receive/transmit antenna, and a directional coupler, connected to the antenna such that signals to be transmitted pass along one line to the antenna, and received signals from the antenna are passed along another line.

12. A radio transceiver as claimed in claim 1, wherein the means for processing received signals comprises a digital signal processor, to which is supplied as a reference input an audio frequency signal from which the signals to be transmitted are derived, the digital signal processor acting to detect and cancel any retaining components of said audio frequency signal in said received signals.

13. A radio transceiver, comprising:
- at least one antenna arrangement, for receiving signals and for transmitting signals;
- means for generating signals to be transmitted having means for receiving a baseband input signal, a local oscillator operating at a local oscillator frequency, and a mixer for upconverting the input signal to a transmission frequency;
- means for sampling the signals to be transmitted;
- means for generating cancellation signals from the sampled signals to be transmitted;
- means for subtracting the cancellation signals from the received signals to produce cancelled received signals for processing;
- means for sampling the cancelled received signals;
- means, having a mixer and receiving the local oscillator signal as one input, for downconverting the sampled received signals to baseband;
- digital signal processing means, responsive to the downconverted sampled received signals and a baseband reference signal, for controlling the generation of the cancellation signals by controlling the signal vector thereof in order to minimise the amount of the signals to be transmitted appearing in the downconverted cancelled received signals;
- means for supplying the baseband input signal to the digital signal processing means as the baseband reference signal; and
- means for processing the cancelled received signals.

* * * * *